United States Patent [19]
Schulze et al.

[11] Patent Number: 5,993,618
[45] Date of Patent: Nov. 30, 1999

[54] DEVICE FOR GENERATING OXYGEN OR A MIXTURE OF OZONE AND OXYGEN

[75] Inventors: Dirk Schulze, Bonn; Wolfgang Beyer, Rheinbach, both of Germany

[73] Assignees: Dirk Schulze, Wolfgang Beyer Bonn, Germany; Rheinbach, Germany

[21] Appl. No.: 08/994,189

[22] Filed: Dec. 19, 1997

[30]     Foreign Application Priority Data

Dec. 19, 1996 [DE]  Germany ............................ 196 53 034
Oct. 10, 1997 [DE]  Germany ........................ 297 18 733 U

[51] Int. Cl.⁶ ................................ C25B 9/00; C25B 15/08
[52] U.S. Cl. ........................ 204/237; 204/262; 204/264; 204/265; 204/266; 204/284; 204/290 R; 204/294
[58] Field of Search ..................................... 204/263–266, 204/262, 237, 283, 291–293, 290 R

[56]         References Cited

U.S. PATENT DOCUMENTS

| | | |
|---|---|---|
| 5,037,518 | 8/1991 | Young . |
| 5,114,549 | 5/1992 | Shimamune et al. ............... 204/263 X |
| 5,484,512 | 1/1996 | Sasaki et al. ........................ 204/263 X |
| 5,796,799 | 8/1998 | Kobayashi et al. ................. 204/263 X |
| 5,798,028 | 8/1998 | Tsuchikawa et al. ............... 204/263 X |

FOREIGN PATENT DOCUMENTS

29504323 U   9/1996   Germany .

OTHER PUBLICATIONS

Handbook of Water Purification, 2nd Edition Water Lorch/Ellis Horwood Ltd. 1987, pp. 513–529, (No Month).
Swiss Chem. 8(1986) Nr. 10a, pp. 31–33, "Function and Applications of an Electrochemical Ozone Generator," by Baumann, Stucki, (No Month).
Chem.–Ing.–Tech. 60 (1988) Nr. 3.S. 180–186, (No Month).
Journal of Applied Electrochemistry 24 (1994) 489–494, (No Month).

*Primary Examiner*—Donald R. Valentine
*Attorney, Agent, or Firm*—Antonelli, Terry, Stout & Kraus, LLP

[57]            ABSTRACT

The invention relates to a device for generating oxygen or a mixture of ozone and oxygen from high-purity water by means of an electrochemical cell in which a buffer vessel is provided for the high-purity water and the high-purity water can be supplied from the buffer vessel to the electrochemical cell through a feed line and oxygen or ozone and oxygen as well as high-purity water is guided from the anode chamber of the cell through a drain line directly into the buffer vessel and a feed line for the oxygen or mixture of ozone and oxygen comes out from the buffer vessel, possibly with the addition of high-purity water, to a consumer.

24 Claims, 10 Drawing Sheets

DEVICE FOR GENERATING OXYGEN OR A MIXTURE OF OZONE AND OXYGEN

The invention relates to a device for generating oxygen or a mixture of ozone and oxygen from high-purity water using an electrochemical cell with an active part located in a housing with an anode chamber containing an anode and with a cathode chamber containing a cathode, and with a solid electrolyte membrane separating the anode from the cathode, and with a buffer vessel for the high-purity water with which vessel the anode chamber is connected by a feed line and with a drain line for the high-purity water containing the generated oxygen or mixture of ozone and oxygen out of the anode chamber, and with a drain line for media out of the cathode chamber. The electroehemical cell also includes a power supply device comprising a tranormer and a power electronic circuit.

As one of the strongest oxidants, ozone is suitable for disinfection, decoloring, deodorizing, and for oxidation processes in general high-purity water technology is a special field of ozone application. Ozone produced electrolytically with an electrolysis cell because practically no other substances occur in high-purity water apart from ozone and oxygen, and the ozone that is not consumed decomposes after a short time. For this reason, the disinfectant action of ozone is usually employed in high-purity water circuits.

Electrolysis cells based on ionexchange membranes in direct contact with electrodes, with the electrodes consisting of a porous material or being coated therewith, are characterized by the ability to operate at high current densities and thus exhibit high conversion rates. The ion-exchange membrane, as a solid electrolyte membrane, simultaneously acts as a separator between the anode and cathode chambers. Cells of this design have been known for a long time, with hydrated, perfluorinated cation exchange membranes being used, which possess electrochemical stability relative to the reducing or oxidizing action of the electrodes (uncoated or coated Nafion 117 membrane, see S. Stucki: "Reaction and Process Technology in Membrel-Water Electrolysis," Dechema Monographien Veriag Chemie 94 (1983) 211).

Reference is also made in this connection to the Handbook of Water Purification, 2nd edition, Walter LorchiEllis Horwood Ltd. 1987, pages 513 to 529, as well as the special publication Swiss Chem 8 (1986) no. 10a, pages 31 to 33, "Function and Applications of an Electrochemical Ozone Generator," by Baumann, Stucki.

The operation of such cells is possible basically in media with a low conductivity, for example chemically pure water. The electrochemical reactions at the electrodes, during operation in high purity water, produce hydrogen and oxygen, white when special anode materials are used, instead of pure oxygen, a mixture of oxygen and ozone can be produced.

In addition, electrochemical energy conversion in fuel cells is known in which, in a reversal of the electrolysis process, electrical energy is produced in the form of low-voltage direct current. In this case, the electrochemical, so-called cold combustion of hydrogen with oxygen in a fuel cell produces corresponding cell voltages, see the article by Hartmut Wendt and Wolfgang Jenseit, "Electrochemical Energy Conversion in Fuel Cells," Chem.-Ing.-Tech. 60 (1988), no. 3, pages 180–186.

Attempts have also already been made to employ the gas diffusion cathodes used in fuel cells for electrochemical energy conversion in cells for the electrochemical generation of a mixture of ozone and oxygen, see the publication by M. Katoh, Y. Nishiki, S. Nakamatsu "Polymer Electrolyte Type—Electrochemical Ozone Generator with an Oxygen Cathode," in Journal of Applied Electrochemistry, vol. 24 (1994), pages 489–494.

Electrochemical cells with β-lead dioxide as the catalyst coating on the anode and with a perfluorinated ion exchange membrane as the electrolyte, have exhibited good performance in generating ozone for disinfection and oxidative treatment of high-purity water systems. In these applications, high-purity water is also the starting material for ozone production, the medium to be treated, and also the coolant for getting rid of the heat that is developed during electrolysis. In such systems, the ozone is added directly to the water to be treated. The hydrogen that is produced as a byproduct at the cathodes of such ozone generators is vented.

The production of gaseous mixtures of ozone and oxygen in electrochemical cells must also take its departure from fully desalinated water as the starting material for technical reasons. Since as a rule large quantities of high-purity water are not available for the applications of gaseous ozone, the high-purity water must be prepared for the operation. Since the preparation of large quantities of tap water to produce the required high-purity water quality involves expenses, the water consumption must be limited to the greatest degree possible to the quantity required for chemical conversion during electrolysis. By conducting the anode water in a circle as well as the water that permeates the membrane to the cathode during electrolysis, however, there is the danger that trace materials will gather in the high-purity water which could lead to poisoning adversely affecting the current yield for ozone generation. In addition, the exhaust heat from the cell cannot be carried away from the system by the high-purity water when the water usage is minimal, but must be removed by a heat exchanger with cooling water.

The power electronic circuit required for rectification of the line current to produce direct current of the suitable voltage for the operation of the electrochemical cell likewise produces a lost power that is removed under current practice by mounting the components of the power elecronics directly on cooling shapes made of aluminum, over which the ambient air is blown by a blower.

U.S. Pat. No. 5,037,518 already teaches an electrochemical cell for producing hydrogen and oxygen by electrolytic splitting of water, said cell being equipped with a buffer vessel for water. However, the water that is removed from the anode chamber or cathode chamber of the electrochemical cell is first separated from oxygen in an oxygen separator or from gaseous hydrogen in a separator and then only the purified water is fed back into the buffer vessel.

The goal of the present invention is to limit the consumption of high-purity water for the operation of electrochemical cells to a necessary minimum and to avoid poisoning the high-purity water and also to improve the cooling of electrochemical cells. The goal of the invention is also to provide a compact device with an electrochemical cell to generate oxygen or a mixture of ozone and oxygen, said device also being easy to transport and handle and having a simple cooling system.

The invention achieves the stated goal as an improvement on a device according to the preamble of the daim by virtue of the fact that the drain line from the anode chamber is guided directly into the buffer vessel and the high-purity water including the oxygen or the mixture of ozone and oxygen is conducted directly from the anode chamber into the buffer vessel, and a feed line for the oxygen or the mixture of ozone and oxygen extends from the buffer vessel, possibly with the addition of high-purity water, to a consumer.

According to the invention, the high-purity water used in the electrochemical cell, including the gasses generated, i.e. oxygen or the mixture of ozone and oxygen, are conducted directly back into the buffer vessel. The oxygen or the mixture of ozone and oxygen for the consumer comes from the buffer vessel. Thus, the high-purity water together with the oxygen or the mixture of ozone and oxygen can be removed from the buffer vessel in any mixed concentration with high-purity water for a consumer.

Further advantageous improvements on the invention will be found in the characterizing features of the subclaims.

Since the electrochemical cell must always be supplied with sufficient high-purity water, it has previously been necessary to have a costly control and regulation using flow monitors in order to ensure this. By using a buffer vessel for the high-purity water to supply the electrochemical cells according to the invention, it becomes possible to supply only as much high-purity water to the cell in simple fashion as is required stoichiometrically. In addition there is the advantage that the oxygen or the mixture of oxygen and ozone that is produced and which is brought back again into the buffer vessel from the anode chamber of the cell, whereby a double decoupling is achieved such that no impurities can get into the high-purity water circuit. The ozone and oxygen mixture or the oxygen can then be supplied to a consumer through a feed line from the buffer vessel with the feed line being located so that it departs the buffer vessel above or below the water level.

According to the invention a circuit is formed for the high-purity water by means of the buffer vessel employed in such fashion that the anode chamber of the electrochemical cell is connected through the feed line and drain line with the buffer vessel.

Preferably the drain line that conducts the water flowing back from the anode chamber of the cell, including oxygen or a mixture of ozone and oxygen into the buffer vessel, is attached in or near the bottom of the buffer vessel. As a result, the gas bubbles that rise in the drain line between the anode chamber and the buffer vessel, the high-purity water is kept circulating in the circuit. In the even that an ozone-oxygen mixture that is as gaseous as possible is to be supplied to the consumer, the feed line is designed so that it departs the buffer vessel in the upper area above the water level.

The addition of high-purity water to the buffer vessel in order to fill said vessel up to a desired level is performed by a water line equipped with a shutoff valve.

In order to avoid contamination of the high-purity water circuit by the electrochemical cell, provision is made in an improvement on the invention such that the feed line has a bypass for the high-purity water between the buffer vessel and the anode chamber, in which bypass a filter device is located that prevents the accumulation of trace materials in the water. The filter device consists for example of a cartridge with a solid bed containing a catalyst to break down the dissolved ozone followed by an ion-exchanger mixed bed to remove ionogenic substances. It is necessary to destroy the ozone to prevent the oxidative destruction of the ion-exchanger resin. The portion of the high-purity water which is circulating through the filter can be adjusted by the dimensions of the feed line and the pressure drop across the filter.

Another possibility for avoiding impurities or poisoning of the high-purity water with which the electrochemical cell is supplied, according to one proposal in the invention, provides that a regulating valve be incorporated in the water line that feeds the high-purity water into the buffer vessel in order to maintain a preset level of fullness in the buffer vessel or to supply a slightly larger quantity of water than corresponds to the required level of fullness. In addition a branch line, equipped with a shutoff valve, is provided off the feed line for the water into the anode chamber before it enters the cell, through which branch line the excess high-purity water can be drained out of the buffer vessel, so that the cell is always operated with the stoichiometrically necessary quantity of high-purity water and no ions can accumulate because of the constant replacement of a certain amount of high-purity water in the buffer vessel.

It is also proposed that a check valve be located in the feed line that comes from the buffer vessel.

If it is desired to remove only a gaseous mixture of ozone and oxygen from the buffer vessel and to supply it to a consumer, it is proposed according to the invention that a filter be provided in the feed line, said filter passing only vapors and gases thus reliably obtaining only a gaseous mixture of ozone and oxygen that is free of water to be conducted further to the consumer.

In order to obtain a compact, portable device for generating a mixture of ozone and oxygen according to the invention, a cooling body is proposed comprising a supporting plate with cooling ribs being formed on one side of the supporting plate and with at least triee eigrochemical cell and the power electronic circuit being located on the side of the supporting plate facing away from the cooling ribs. The cooling body according to the invention permits both the removal of the heat that is generated and its redistribution, and simultaneously constitutes the supporting body or mounting body for the individual device components of the system, namely the cell, power electronic system, transformer, connections for adding and removing the various media. In particular, the heat is removed by convection over the cooling ribs.

In an advantageous improvement, it is proposed to mount the buffer vessel for the high-purity water on the supporting plate of the cooling body. In this way it is possible to control the temperature of the high-purity water as well with the aid of the supporting cooling body. A preferred arrangement of the device parts provides for the cell to be mounted in the lower area of the supporting plate and for the buffer vessel to be located above the cell on the supporting plate.

The electrochemical cell, buffer vessel, and power supply device together with the power electronics and possibly a transformer can be mounted on the cooling body. According to the invention, therefore, a single cooling block is provided equipped for example with cooling ribs and on which both the cell, that generates heat, as well as the power supply device, that generates heat, are mounted, so that they can be cooled using only one cooling device, Similarly, the high-purity water that is in the circuit is cooled in the vicinity of the buffer vessel. Advantageous embodiments of the cooling body can be derived from the characterizing features of claims 16 to 20. In particular, the cooling body can be manufactured economically as an extrusion-molded section from aluminum or aluminum alloy for example and can then be trimmed to the desired length for the respective system.

According to one proposal of the invention, the electrochemical cell, projecting horizontally from the supporting plate, is mounted in the lower area of the supporting plate of the cooling body, with the supporting plate being mounted vertically, with the buffer vessel mounted above the cell, and with the power electronic system and possibly the transformer mounted between the cell and the buffer vessel. A further improvement in cooling is achieved if for example cooling panels are mounted on the cell or the buffer vessel.

Especially advantageously, the cell can be equipped according to the invention with a cathode cooling body which is integrated into the cooling body. Preferably the buffer vessel is connected on its side facing away from the supporting plate with a cooling body that has cooling ribs.

In addition it is proposed to equip the buffer vessel with a level control for the height of the water level, comprising a solenoid valve and a pump in the return line for the high-purity water as well as an LC control device that acts on the pump and the solenoid valve.

The device according to the invention for generating a mixture of ozone and oxygen can be combined with an electrochemical cel using a buffer vessel for the high-purity water circuit according to the characterizing features of claims 8 or 9.

The device according to the invention for generating oxygen can be equipped with an electrochemical cell according to the characterizing features of claims 10 or 11.

The cooling technology of the device according to the invention can be improved advantageously by using a gas diffusion electrode as the porous cathode in the process for ozone production or oxygen production by means of an electrochemical cell, since when air passes through the porous cathode, a cooling effect of the air as well as the bonding of the hydrogen also takes place.

Instead of a cathode that produces hydrogen, it is proposed in an improvement on the invention to equip the cell with a gas-iffusion electrode as a cathode. In this case, the cell is mounted directly on the supporting plate designed as a cooling body in such fashion that the gas-diffusion cathode is supplied from its rear with air through grooves formed there. Instead of hydrogen generation like that in conventional electrochemical cells for hydrogen/ozone generation with sufficient exposure to air, the air and oxygen are reduced to form water electrochemically on the gas-diffusion electrode. The air flow is provided by a cooling blower. The air flowing past the gas-diffusion electrode effectively cools the electrochemically active part of the cell, the membrane-electrode package. This cooling takes place firstly as a result of the heating of the air flowing past the cathode, perceptible heat, and also, in an effective manner, by evaporating the water that precipitates on the cathode by an electrochemical reaction and membrane water transport-latent heat. The combination according to the invention of a buffer vessel for the high-purity water supplied to the cell and the use of a gas-diffusion electrode as the cathode simultaneously fulfills the purpose of avoiding hydrogen formation as well as effective removal of heat.

In the electrodes of the electrochemical cell for generating a mixture of oxygen and ozone, at least the anode is coated with platinum or platinum metals, with the coating being applied galvanically for example. In addition, for generating ozone, the anode is galvanically coated with β-lead dioxide as a catalyst. Only electrodes of an electrochemical cell, coated with platinum or platinum metals, of the designs described above can be used for generating oxygen alone. Wth the same design, an oxygen-generating cell differs from a cell that generates ozone and oxygen only by the lack of the catalyst layer, β-lead dioxide for example.

In an improvement on the invention it is therefore proposed that an electrochemical cell that generates oxygen from high-purity water is provided and connected in series with the electrochemical cell that generates the mixture of ozone and oxygen in such fashion that the two electrochemical cells are supplied with high-purity water through the buffer vessel and both the oxygen that is produced as well as the mixture of ozone and oxygen that is produced are conducted from the respective cells into the buffer vessel and the high-purity water is guided in the circuit. Preferably the oxygen that is generated or the mixture of ozone and oxygen that is generated are fed back into the same buffer vessel, making it possible to vary the concentration of the ozone in the ozone-oxygen mixture by a corresponding additional amount of oxygen from the cell that generates oxygen alone.

The use according to the invention of two electrochemical cells of essentially the same design, one of which generates oxygen and the other generates a mixture of ozone and oxygen, combined with a joint buffer vessel for the high-purity water circuit, makes it possible for the concentration of the ozone removed from the buffer vessel through the feed line and generated in the cell that generates the mixture of ozone and oxygen to be controlled by means of the quantity of oxygen that can be generated in the electrochemical cell that generates oxygen, in other words, it is variable and adjustable.

According to another proposal according to the invention, a recycling system for drinking water or permeating water from the cathode to produce high-purity water for the high-purity water circuit of the cell is provided.

Especially in conjunction with a gas-diffusion electrode, it is proposed that a preparation container be provided which can be supplied both by a drinking water section and also by the permeating water from the cell that is carried away from the cathode chamber and the water from the preparation container can be supplied to an ion exchanger system and from there can be supplied to the buffer vessel as purified high-purify water.

The invention will now be explained with reference to the drawing using embodiments.

Figure 10:
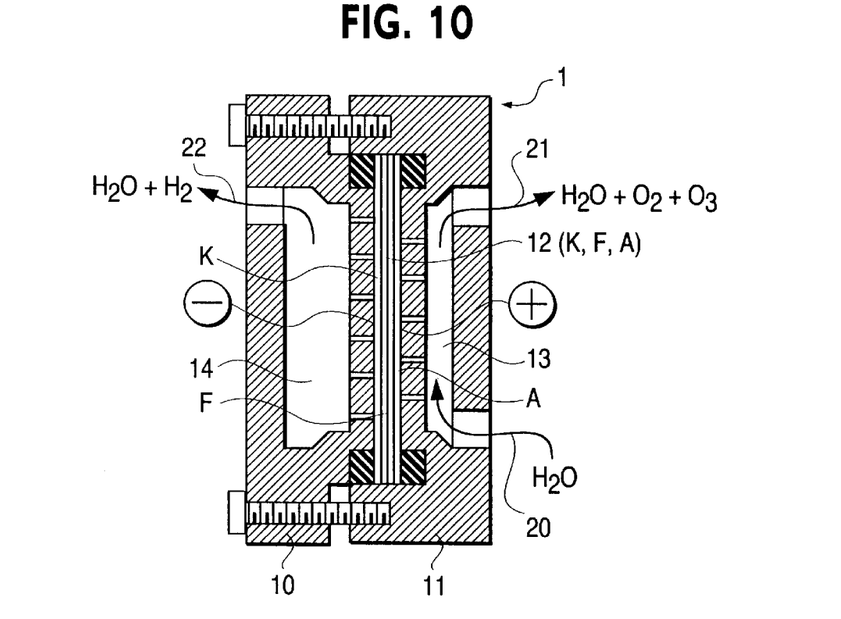
FIG. 10 is a schematic view of a cross section through an electrochemical cell for generating a mixture of ozone and oxygen, in which hydrogen is produced at the cathode according to the prior art.

FIG. 10 shows schematically an electrochemical cell 1 with housing parts 10 and 11 connected for example permanently together by means of screws and seals, with a central active part 12 comprising a cathode K, a solid electrolyte membrane F, an anode A, an anode chamber 13 with feed line 20 for high-purity water and a drain line 21 for the high-purity water including a mixture of ozone and oxygen as well as a cathode chamber 14 with a drain line 22 for the hydrogen that is produced in small quantities as a byproduct, and permeating water. A design of such an electrolysis cell is described for example in DE-GM 295 04 323. In this case, as the catalyst layer for generating ozone, a galvanically applied β-lead dioxide layer is provided on one of the electrodes, in this case the anode, with the electrodes being precoated with platinum or platinum metals. Without the β-lead dioxide coating, this electrochemical cell can only be used for generating oxygen. No ozone is generated under these conditions.

Figure 11:
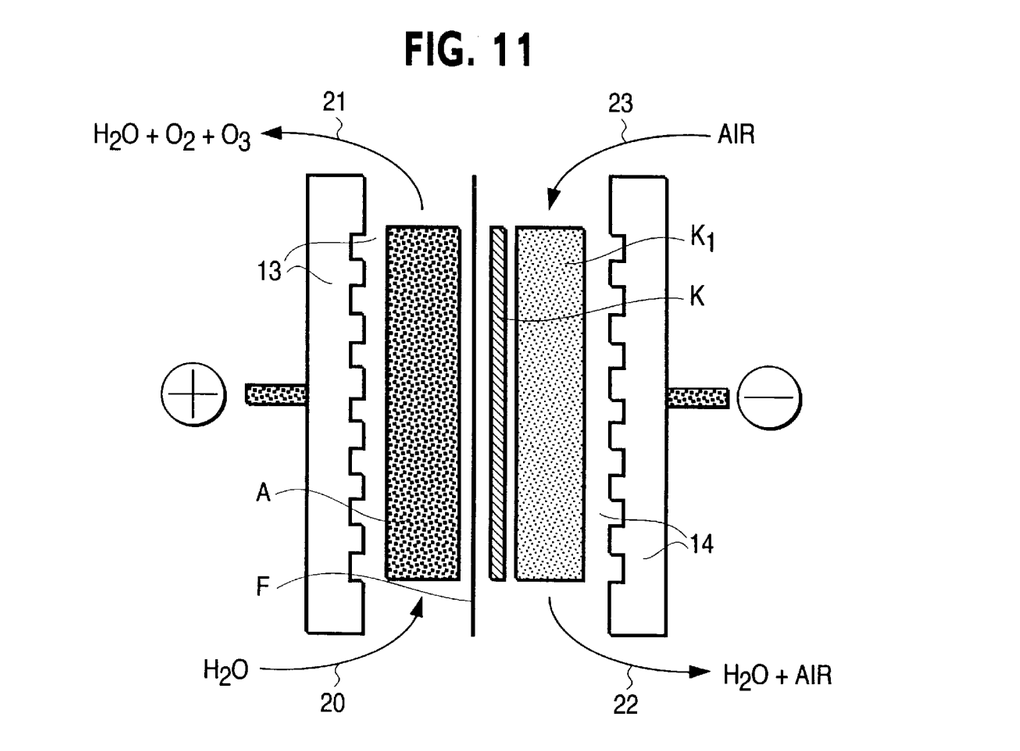
FIG. 11 is a schematic diagram of a cross section of an electrochemical cell for generating a mixture of ozone and oxygen with a gas-diffusion electrode as the cathode according to the prior art.

For example, FIG. 11 shows an electrochemical cell 1 for generating ozone or a mixture of ozone and oxygen, in which a gas-diffusion electrode is provided as porous cathode K. Gas-diffusion electrodes are known as described at the outset. A gas-diffusion electrode of this kind can have a carrier material made of planar /?/ woven carbon fiber fabric, for example 116 g/m$^2$ with a thickness of 0.36 mm. The finished catalyzed electrode then has a sightly greater thickness in the range from 0.4 to 0.5 mm corresponding to the catalyst load. The exdusion of liquid water from the pores on the gas side is achieved by means of a hydrophobic fluorocarbon/carbon layer. The catalyst is applied on one side only, for example based on platinum. Gas-diffusion electrodes of this type are commercially available. The porous anode is designed in a manner analogous to the cell in FIG. 10. A design of the electrochemical cell like that described in the Journal of Applied Electrochemistry 24, 1994, pages 489–494 can also be used for the invention. It is important to note that by comparison to the cell in FIG. 10, by using a gas-diffusion electrode as porous cathode K, an air supply channel 23 to the cathode or the cathode chamber 14 is also provided so that the cathode is traversed by air and, on the side located opposite the air supply side, the air as well as the air-oxygen reduced electrochemically to form water are carried away once again through drain line 22. By constantly bubbling with air through feed line 23, the cathode and the cathode current collector K1 are simultaneously cooled. On the anode side A on the other hand, the high-purity water $H_2O$ is supplied through feed line 20 and the resultant mbiture of ozone and oxygen $O_3O_2$ together with the high-purity water $H_2O$ on the opposite side are carried away again from anode chamber 13 through drain line 21. If an anode is used that is not coated with β-lead dioxide, only oxygen can be generated by this cell, but no ozone.

Figure 1:
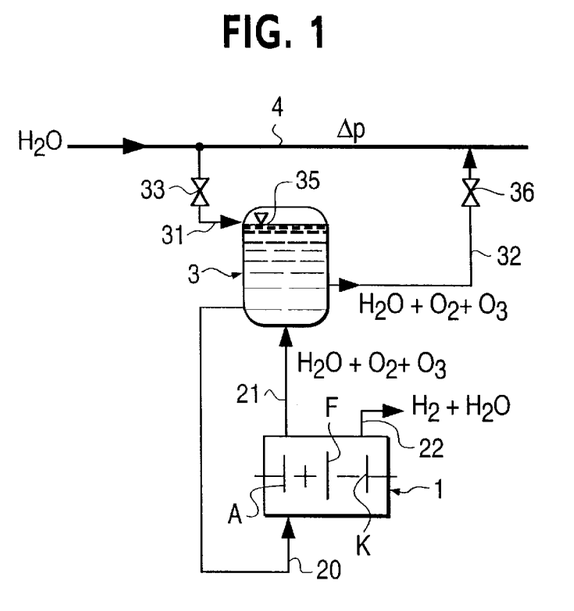
FIGS. 1–3 show high-purity water supply circuits with a buffer vessel for an electrochemical cell in which hydrogen is produced as a byproduct and is removed for generating the mixture of ozone and oxygen.

FIG. 1 shows an electrochemical cell 1 according to the design explained in FIG. 10 for generating a mixture of ozone and oxygen. To supply cell 1 with high-purity water, a buffer vessel 3 is provided from which feed line 20 for the high-purity water takes Its departure for the anode chamber of cell 1. Drain line 21 from the anode chamber of the cell for the high-purity water inducing the mixture of ozone and oxygen is returned to buffer vessel 3. In this manner, a circuit is formed for the high-purity water to supply the cell and assurance is provided that the cell is always supplied with a sufficient quantity of high-purity water. Buffer vessel 3 is filled with high-purity water up to the filling mark, water level 35. This level is set so that the uniform supply for cell 1, which is always necessary, is always guaranteed with a stoichiometric quantity of high-purity water through feed line 20. Buffer vessel 3 is filled through water line 31 equipped with a shutoff valve 33. Water line 31 in turn can branch off a consumer line 4 for high-purity water. From buffer vessel 3, a consumer is supplied through feed line 32 with a mixture of high-purity water, oxygen, and ozone, for example consumer line 4 for ozone treatment. There is also a check valve 36 in the feed line. The hydrogen that is generated at cathode K of cell 1 as well as the permeating water are carried away from cell 1 through drain line 22.

Figure 4:
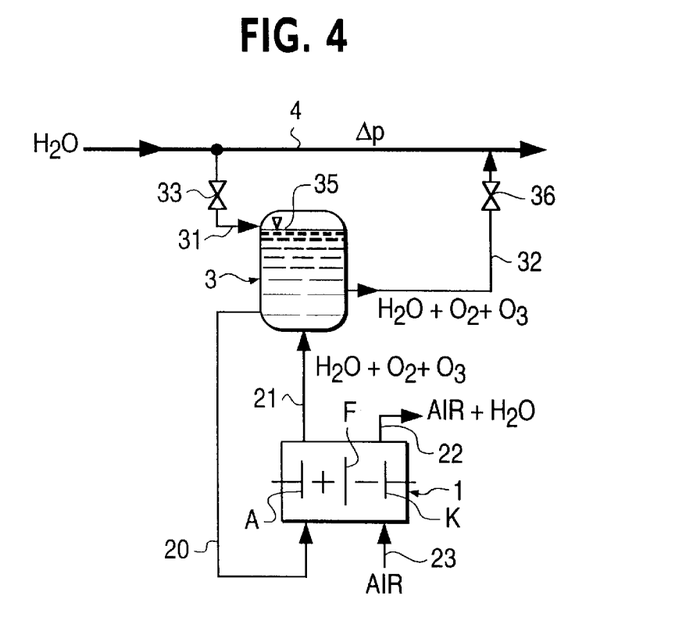
FIGS. 4–6 show high-purity water supply circuits with a buffer vessel for an electrochemical cell that has a gas-diffusion electrode as the cathode.

FIG. 4 shows a supply of an electrochemical cell to generate ozone with a buffer vessel 3, said supply differing only by the use of an electrochemical cell 1 that is designed in accordance with FIG. 11. In this case, electrochemical cell 1 has a gas-diffusion electrode as porous cathode K which is subjected to an air flow through air line 23 and whereby air is carried away on the cathode side through drain line 22 and the water transported by the current flow through membrane F is carried away as well. According to FIGS. 1 and 4, by means of buffer vessel 3, uniform constant supply of cell 1 with high-purity water is ensured, with the constant removal of high-purity water through feed line 32 providing a constantly renewed supply of high-purity water through water line 33 into buffer vessel 3 so that accumulation of ions in the buffer vessel is avoided. According to this proposal of the invention, a constant uniform supply for electrochemical cell 1 with high-purity water is ensured, while at the same time poisoning of this high-purity water in the circuit is avoided.

Figure 2:
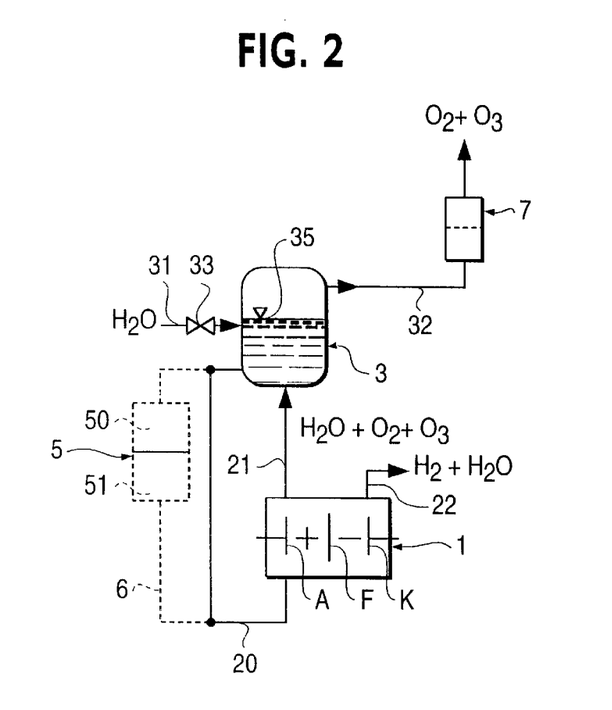
Figure 5:
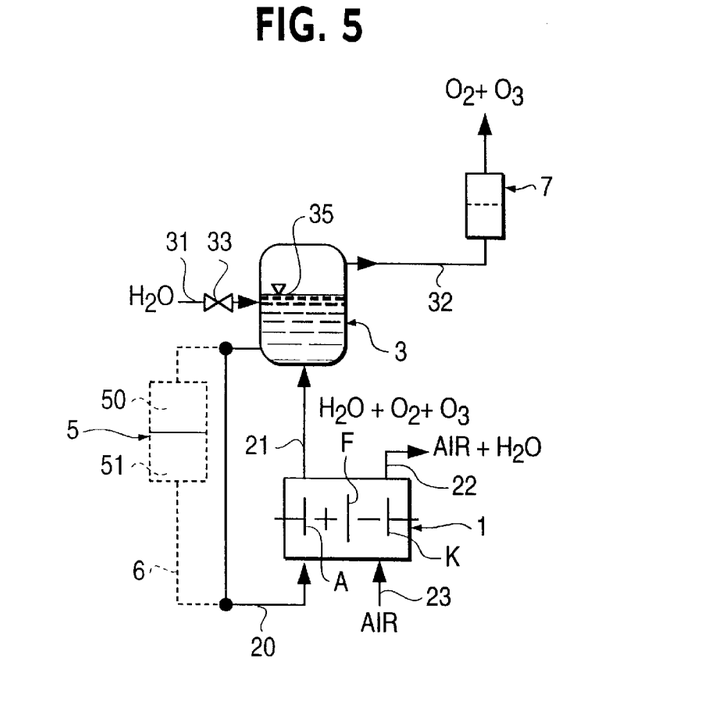

In the proposal according to the invention according to FIGS. 2 and 5 for supplying an electrochemical cell 1 with high-purity water, in addition to the circuit shown in FIGS. 1 and 4, a bypass 6 is provided in feed line 20 for the high-purity water that comes from buffer vessel 3 into cell 1, in which bypass a filter device 5 is located. The filter device consists of a solid bed 50 containing a catalyst for breaking down the ozone dissolved in the high-purity water and an ion-exchange mixed bed 51 located downstream to remove ionogenic substances from the high-purity water.

In addition, for example in the system shown in FIG. 2, provision is made such that feed line 32 comes off above the water level 35 of the water reservoir from buffer vessel 3 so that to the greatest extent possible, only gaseous mixtures of ozone and oxygen can be removed and supplied to a consumer. In addition, a filter 7 is provided in feed line 32 for example in order to obtain to the greatest degree possible only gaseous ozone and oxygen. In the system according to FIG. 2, an electrochemical cell according to FIG. 10 in terms of design and operation is used as electrochemical cell 1, as in FIG. 1. In addition, the high-purity water supply shown for an electrochemical cell 1 for supplying ozone according to FIG. 2 can be used for an electrochemical cell according to FIG. 10 with a gas-diffusion electrode as a porous cathode, as shown for example in FIG. 5. The circuit for the high-purity water through buffer vessel 3 to cell 1 and back to the buffer vessel with the supply of the water line and removal of the mixture of ozone and oxygen that is produced through the feed line proceeding analogously as explained in FIG. 2.

Figure 3:
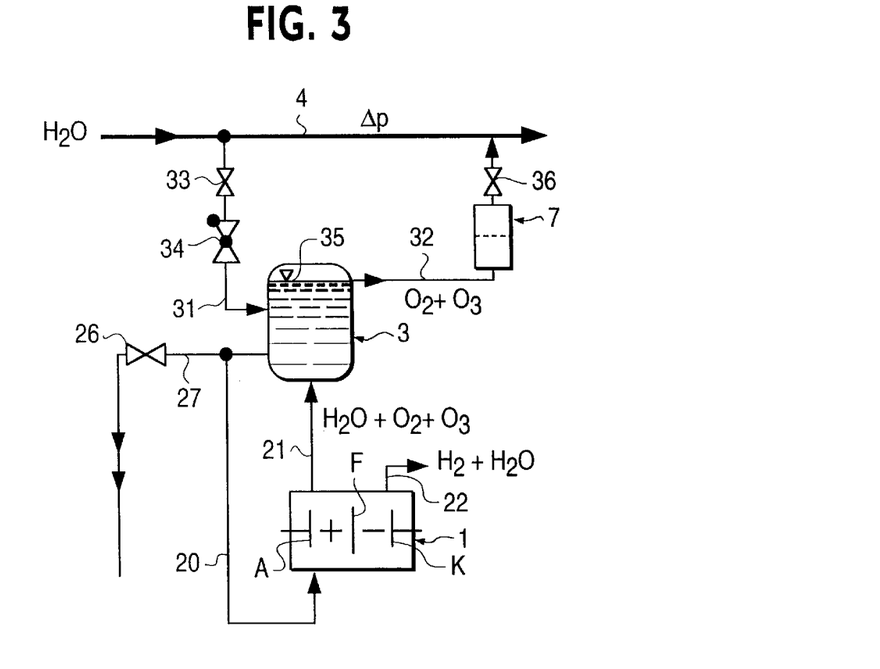
Figure 6:
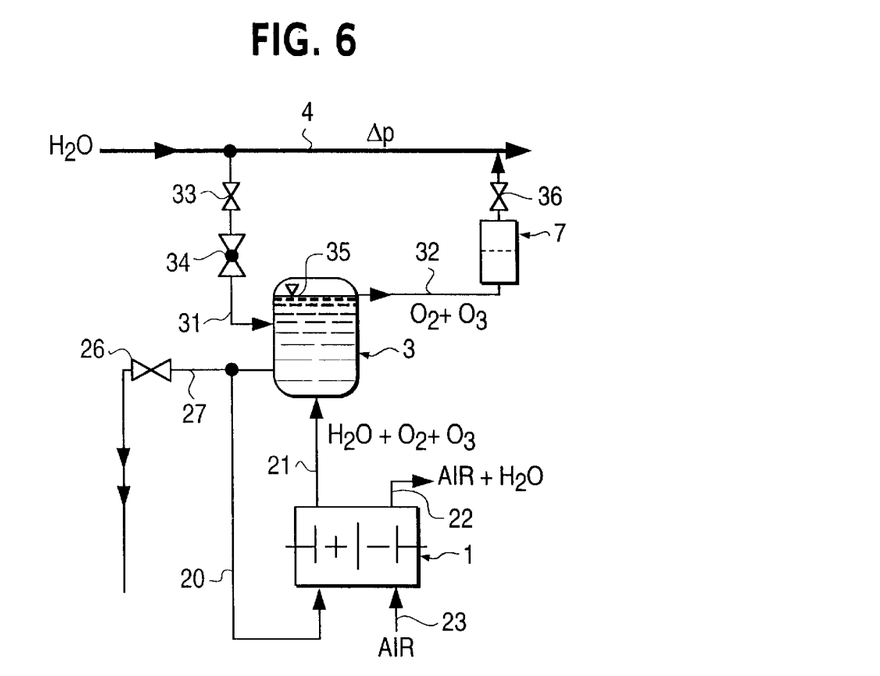

FIG. 3 shows another variation of the supply of the electrochemical cell for ozone generation with high-purity water, with a buffer vessel 3 being provided from which the anode is supplied through feed line 20 and the mixture of ozone and oxygen that is generated together with the high-purity water is recycled through drain line 21 from the anode chamber of cell 1 back into buffer vessel 3. The supply of the high-purity water to buffer vessel 3 takes place through water line 31 which is additionally provided with a regulating valve 34. The mixture of ozone and oxygen is carried away through a feed line 32 from buffer vessel 3, said feed line departing above water level 35. With the aid of regulating valve 34, it is possible to keep the water level 35 of the high-purity water in buffer vessel 3 constant at the same height so that at all times, as much high-purity water is added to buffer vessel 3 through water line 31 as is lost. At the same time, this ensures that the cell is always supplied with sufficient stoichiometric amounts of high-purity water. It is also possible to add slightly more water than necessary through regulating valve 34 into buffer vessel 3 through water line 31, if, as proposed, care is taken to ensure that the excess quantity is carried away once more. Provision is made in this connection to locate a branch line 27 on feed line 20 from buffer vessel 3 to the anode chamber of cell 1, said branch line being provided with a shutoff valve 26. Thus it is possible to drain off again into branch line 27 excess water supplied through line 31 into the buffer vessel so that constant replacement of the high-purity water in the circuit supplying cell 1 takes place and no ions can accumulate in buffer vessel 3. A system according to FIG. 3 can be equipped with an electric chemical cell with the design according to FIG. 10 and also with an elecrohemical cell with the design according to FIG. 11, see the similar system in FIG. 6.

Figure 7:
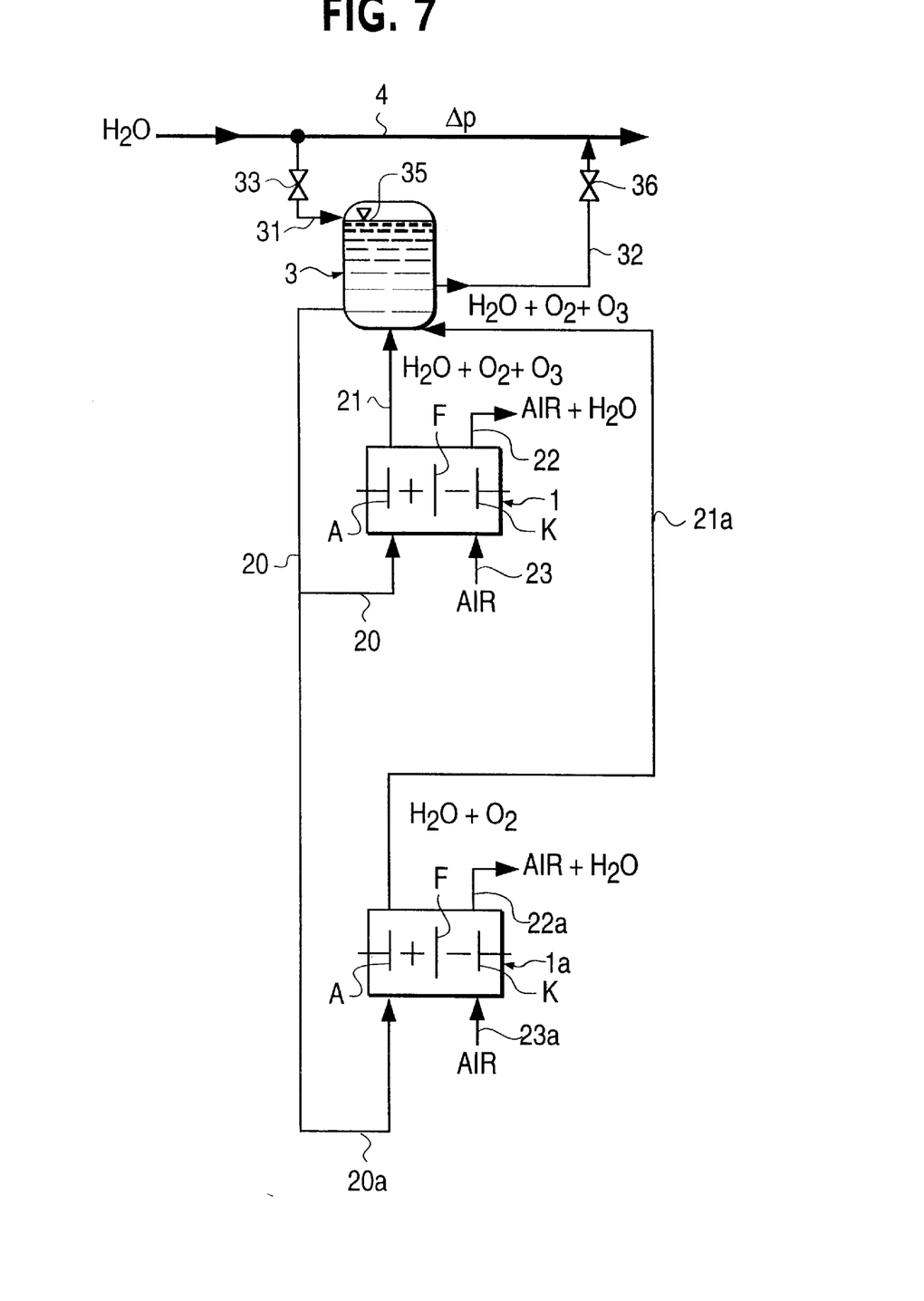
FIG. 7 shows a diagram of the supply for two electrochemical cells connected in series with a high-purity water circuit with a buffer vessel for producing a mixture of ozone and oxygen and oxygen.

FIG. 7 is a schematic diagram of a system for generating a mixture of ozone and oxygen based on two electrochemical cells 1, 1a connected in series, with first cell 1 generating a mixture of ozone and oxygen, an ozone generator, and a second cell 1a generating oxygen alone.

The two electrochemical cells 1, 1a can have essentially the same design with an anode, solid electrolyte membrane, and a cathode, for example an air cathode or gas-diffusion electrode, as described above, said electrodes differing only in the active catalyst coating. In the cell 1 that generates ozone, a β-lead dioxide coating is provided on the anode as a catalyst coating in addition to a platinum and platinum-metal coating.

The high-purity water supply of the two cells 1, 1a comes from buffer vessel 3, from which feed line 20 leads with a branch into the anode chamber of first cell 1 to generate the mixture of ozone and oxygen, and branch 20a leads into the anode chamber of the electrochemical cell 1a that generates oxygen. The mixture of ozone and oxygen generated in cell 1 is then recycled into buffer vessel 3 together with the high-purity water through drain line 21, and the oxygen that is generated in cell 1a is recycled together with the high-purity water through drain line 21a back into buffer vessel 3. By varying the quantities of gas produced in cell 1, namely oxygen, the concentration of the mixture of ozone and oxygen produced in the first cell can be varied by combination in the buffer vessel, so that a mixture of ozone and oxygen whose composition is variable or adjustable can be supplied to the consumer through feed line 32.

Figure 8:
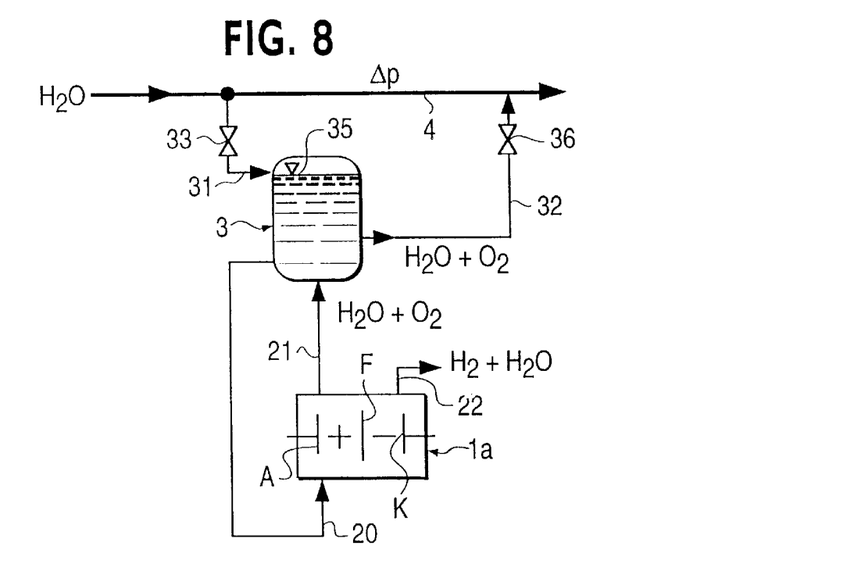
FIG. 8 shows a high-purity water circuit with a cell for generating oxygen.

FIG. 8 shows a device according to the invention with buffer vessel 3 similar to that in FIG. 1, using an electrochemical cell 1a that generates only oxygen There is no ozone. The advantages gained with the high-purity water circuit by using buffer vessel 3 are the same as those obtained when using a cell to generate a mixture of ozone and oxygen.

Figure 9:
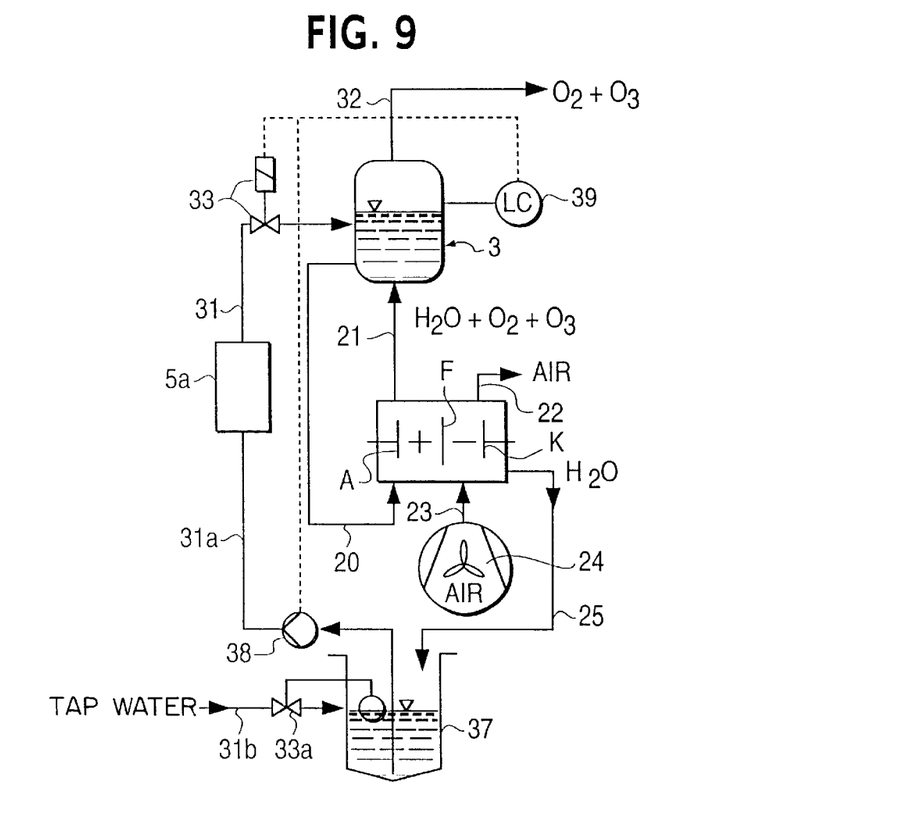
FIG. 9 is a diagram of a high-purity water supply circuit for an electrochemical cell to generate a mixture of ozone and oxygen with water recycling.

FIG. 9 shows the flowchart for a high-purity water supply circuit of an electrochemical cell for generating a mixture of ozone and oxygen which also includes recycling for the water permeating into the cathode chamber and its return to the high-purity water circuit.

The basis is an electrochemical cell 1 with a gas-diffusion electrode as a porous cathode, see for example the high-purity water circuit in FIG. 5. Buffer vessel 3 for the high-purity water is initially supplied with water from the tap. The tap water from the tap water system is supplied through line 31b with check valve 33a to a preparation container 37. From this preparation container 37, the water is supplied through a line 31a with pump 38 to an ion exchanger 5a from which it is supplied as high-purity water through line 31 with a magnetic check valve 33 to buffer vessel 3. Solenoid valve 33 and pump 38 are actuated by an LC control. Pump 38 can also be located between ion exchanger 5a and buffer vessel 3 in line 31. In cases in which the gas phase of the mixture of ozone and oxygen that is drawn off through line 32 from buffer vessel 3 is not separated as the gas phase, it is also possible to omit the solenoid valve 33.

From buffer vessel 3 the high purity water is then supplied through line 20 to electrochemical cell 1, as described above, specifically into anode chamber A. High-purity water, ozone, and oxygen are then supplied from the anode chamber through line 21 to buffer vessel 3 once more, At a gas-diffusion electrode serving as cathode K, the cathode chamber is flooded with air through line 23, with a bower 24 being located in this air line. On the opposite side the air is removed through line 22 from the cathode chamber. The water permeating from the anode chamber into the cathode chamber is removed from the cathode chamber through line 25 and supplied to preparation container 37. Here the recycled water is supplied together with the fresh water from the tap to the reprocessing and the ion exchanger 5a and then returned to the circuit through buffer vessel 3.

Figure 12A:
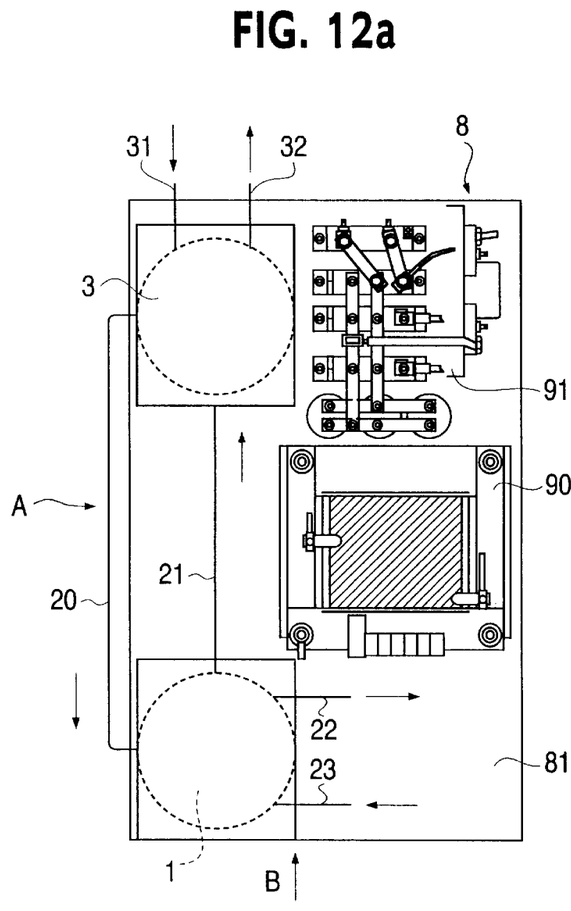
FIGS. 12*a–c* show a device for generating a mixture of ozone and oxygen with a compact design, with an electrochemical cell, buffer device, power supply, and cooling block in three views.
Figure 12B:
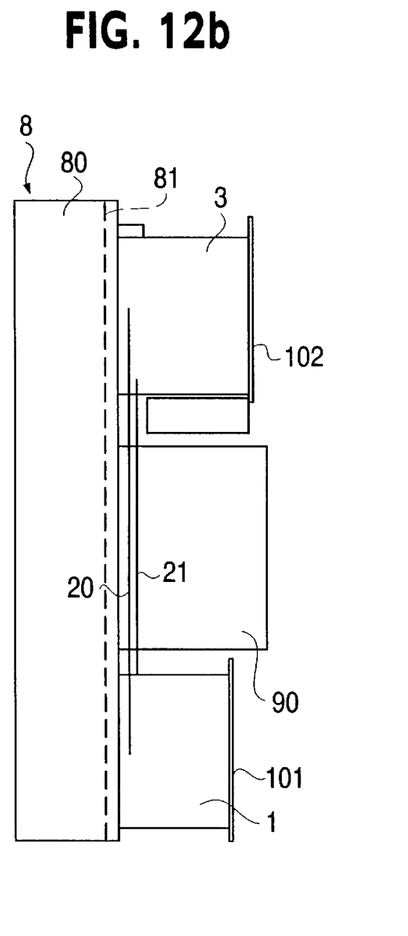
Figure 12C:
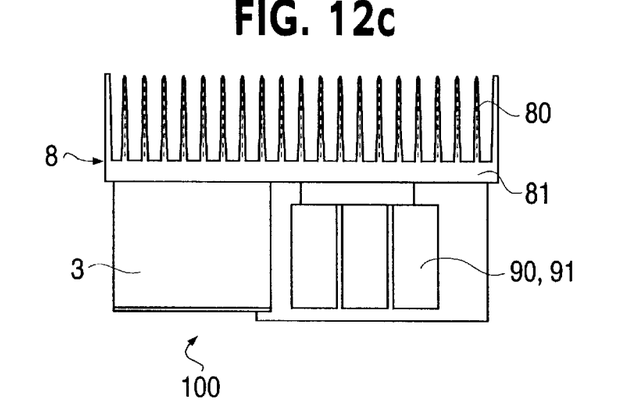

The schematic diagram of a compact device for generating a mixture of ozone and oxygen or oxygen according to the circuits explained in the foregoing FIGS. 1 to 9 is shown in FIG. 12a in a top view, in FIG. 12b in a schematic side view A according to FIG. 12a, and in FIG. 12c in a schematic side view B according to FIG. 12a. It is important to note that cooling of both cell 1 and the power supply of the cell is performed at least as far as the power electronics and the buffer vessel are concerned, by means of a single cooling body 8 that is simultaneously designed as a supporting body with supporting plate 81 and cooling ribs 80. Cooling body 8 has cooling ribs 80 molded on the underside of supporting plate 81 and can also be subjected to a breeze from a blower not shown. Supporting plate 81 extends vertically in the design of the device and the ribs likewise run parallel to one another vertically. On supporting plate 81, of cooling body 8, electrochemical cell 1 is mounted at the bottom and above it the buffer vessel 3 for the high-purity water supply and, at a suitable location the power supply with power electronics 91 and possibly transformer 90. The lines for the high-purity water supply of buffer vessel 3, namely water line 31, feed line 20 from the buffer vessel to cell 1, and drain line 21 from cell 1 into buffer vessel 3 as well as feed line 32 from buffer vessel 3 for a consumer of the mixture of ozone and oxygen are shown schematically in the top view in FIG. 12a. In addition, cell 1 is equipped with at least one drain line 22 for hydrogen and water or air in water, and in the case of a gas-diffusion electrode being used as a cathode, with an additional air feed line 23 and possibly an air drain line 25 as well. Cell 1 as well as buffer vessel 3 can be covered on the top by cooling plates 101, 102, see FIG. 12b. The structure of a device for ozone-oxygen generation, shown in FIGS. 12a, b, and c is only one example of possible arrangements of the cell, buffer vessel, and power supply on the cooling body. It is important to design a cooling body both as a supporting body for at least the electrochemical cell 1, a buffer vessel 3 for high-purity water, and the power electronics for cell 1. Transformer 90 required for the power supply can likewise be mounted on supporting plate 81 of cooling body 8. It can also be looted separately therefrom. Cooling body 8 can be manufactured in economical fashion as an extrusion-molded section of metal for example and serves to carry away the heat generated by cell 1 and power electronics 91. When the quantities of heat to be removed are large, a blower can also be provided in order to increase the air flow between cooling ribs 80 of the cooling body.

The invention makes it possible to provide a compact device for generating ozone and oxygen with an effective, simple cooling system and cooling body and a reliable supply with high-purity water in a relatively small amount by using a buffer vessel, so that poisoning of the high-purity water can be avoided by simple means.

Figure 13A:
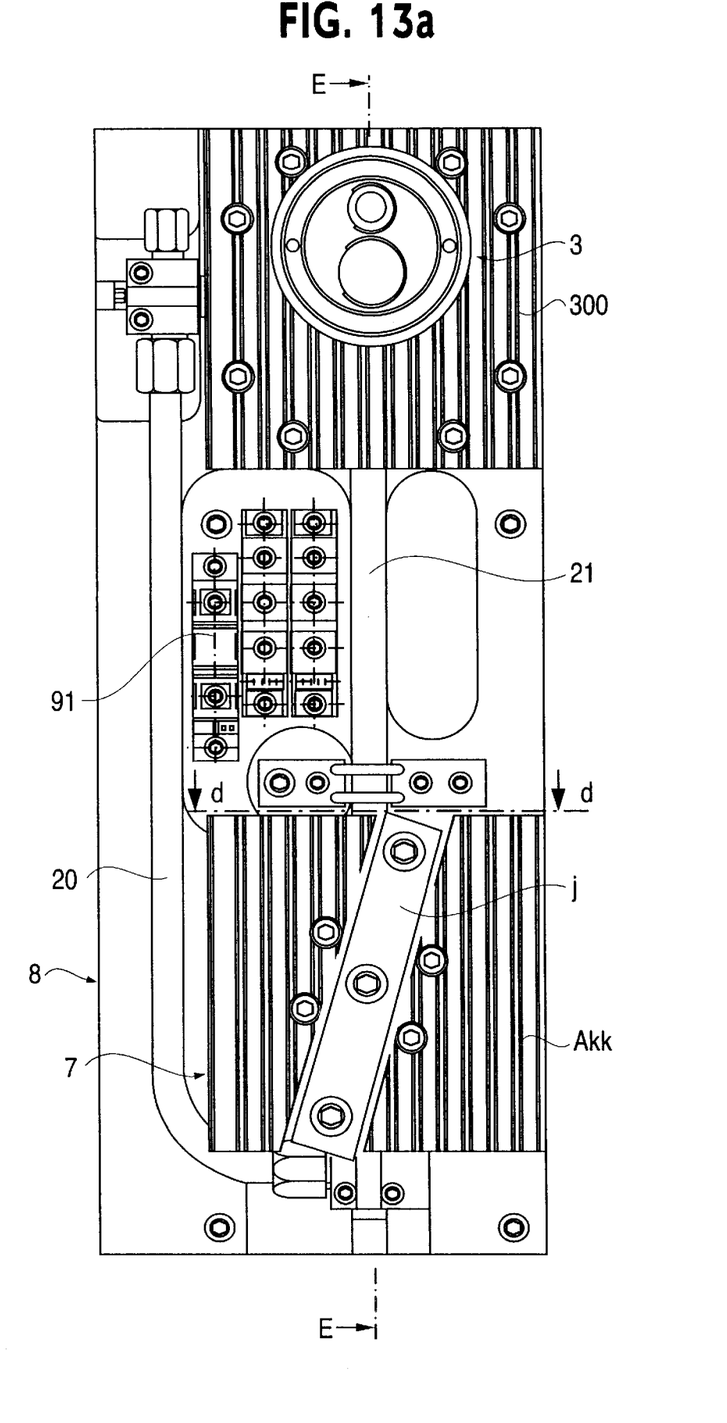
FIGS. 13*a–d* show a variation on the device in FIGS. 12*a–c* in various views.

FIG. 13a shows a front view of a compact device for generating a mixture of ozone and oxygen with a cooling body 8, which is simultaneously the supporting body, an electrochemical cell 1, power electronics 91, and buffer vessel 3 in another version.

Figure 13B:
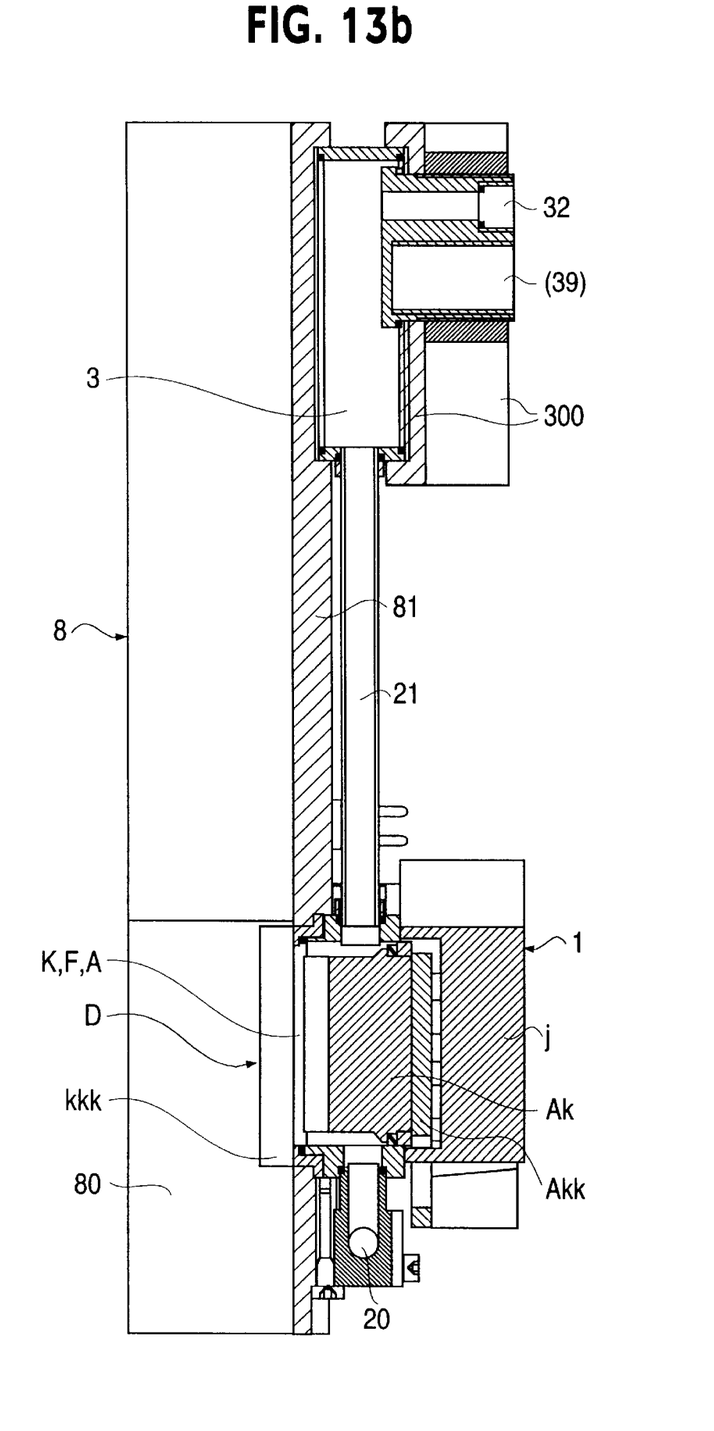
Figure 13C:
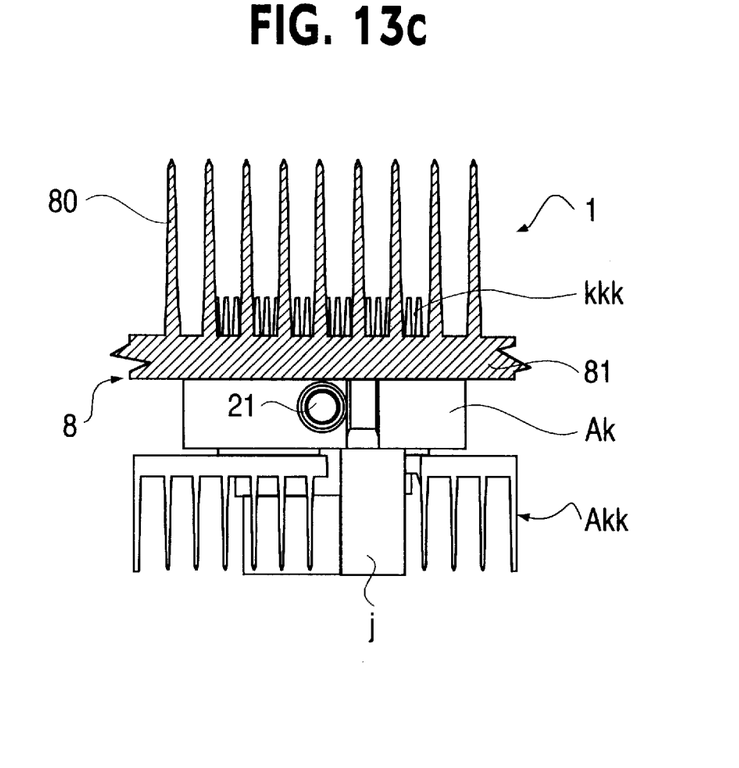
Figure 13D:
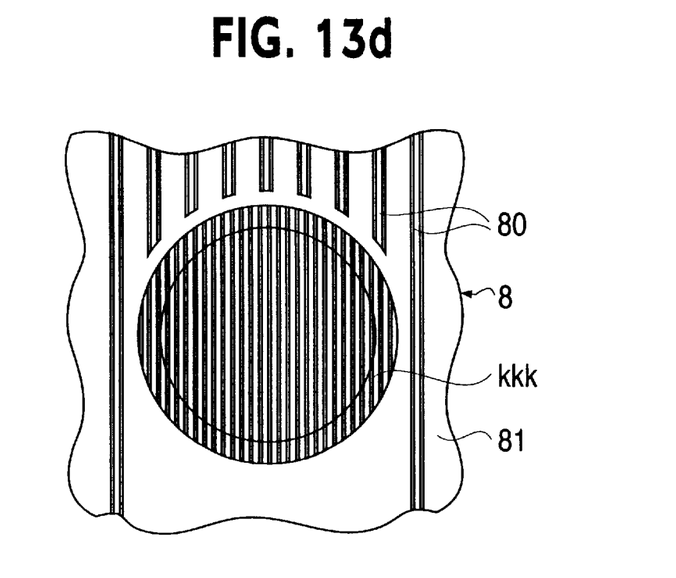

FIG. 13b shows a lengthwise section EE through FIG. 13a, FIG. 13c shows a view of the electrolysis cell sectioned along CC in FIG. 13a, and FIG. 13d shows view D according to FIG. 13b of the electrolysis cell from the cathode side. In the device according to FIGS. 13a–d, a cooling body 8 is also provided which is also a supporting body that has a supporting plate 81 with lengthwise ribs 80 molded in it, with the standing position of the cooling body being designed so that supporting plate 81 extends vertically as in FIG. 13b. On the supporting plate, on the side opposite cooling ribs 80, electrochemical cell 1 is located in the lower area and buffer device 3 is located in the upper area. Cooling body 8 is made from a metal that is a good conductor of heat, for example as an extrusion molded section. In addition, a blower can also be provided to carry away the heat but it is not shown here.

The electrolysis cell that can have a schematic design explained for example in accordance with FIGS. 10 or 11 is likewise designed with cooling bodies for good heat removal by air flow. As is also evident from the view in FIG. 13c, the anode body AK on its exterior likewise has an anode cooling body AKK provided with cooling ribs. On the cathode side as well, a cathode cooling body KKK is provided with ribs. As can be seen from the section in FIG. 13b, electrolysis cell 1 with the anode body and cathode body is placed in supporting plate 81 of the cooling body 8, so that the heat generated in the vicinity of the electrochemical cell can be carried away to cooling body 8 directly. The connection of return One 21 for the high-purity water inducing the oxygen and ozone from cell 1 to buffer vessel 3 is likewise shown. On the cathode side of cell 1, as can be seen from FIG. 13d, cooling body 8 is made thinner from ribs 80 in the vicinity of cathode cooling body KKK.

Buffer vessel 3 is also covered on its side facing away from supporting plate 81 of cooling body 8 with an additional cooling body 300 provided with ribs. In this manner, the temperature of the high-purity water contained in buffer vessel 3 can likewise be controlled. In cooling body 300 of the buffer vessel, the outlet for line 32 for the mixture of ozone and oxygen in the consumer direction is provided. Moreover, in cooling body 300, buffer vessel 3 a recess is provided for control device 39 for valve 33, as explained in conjunction with FIG. 9.

Between buffer vessel 3 and cell 1, the power electronics 91 are mounted on supporting plate 81. These electronics are also located on the side facing away from ribs 80 of cooling body 8 in such fashion that good heat-conducting contact is created between power electronics 91 and cooling body 8, in order to carry away the lost heat from the power electronics.

Further ways of connecting the lines are likewise provided in the device according to FIGS. 13a–d, but are not shown in greater detail here.

Control device 39 for solenoid valve 33 also comprises a level coil for the buffer vessel.

In addition the arrangement of the electrochemical cell 1 and buffer vessel 3 on cooling body 8 according to the invention makes it possible to use the evaporation enthalpy for cooling as well. The entire system can have a compact design. Moreover, the cathode cooling body can be integrated into the cooling body.

While in known systems cooling was dependent on the through-flow and operation of the electrochemical cell and at most additional air cooling was provided by a blower, according to the invention, basic cooling is provided by the cooling body and additional air cooling by means of a blower is only required at high power levels.

In particular, the invention makes it possible when using gas-diffusion electrodes for the cathode to use the evaporation enthalpy liberated at the cathode to cool the power electronics. The buffer vessel can also be kept at a desired temperature in this manner since the evaporation enthalpy on the cathode side can be utilized by conducting heat through the cooling body.

We claim:

1. Device for generating oxygen or a mixture of ozone and oxygen from high-purity water comprising an electrochemical cell including an active part located in a housing, the housing having an anode chamber containing an anode, a cathode chamber containing a cathode, a solid electrolyte membrane separating the anode from the cathode, and a buffer vessel for high-purity water wherein the buffer vessel is connected to the anode chamber by a feed line, and for the high purity water having a drain line for high-purity water containing the oxygen or mixture of ozone and oxygen that is generated from the anode chamber, and having a drain line from the cathode chamber; wherein the drain line from the anode chamber is connected directly into the buffer vessel to conduct the high-purity water including the oxygen or the mixture of ozone and oxygen out of anode chamber directly into the buffer vessel, and a feed line out of the buffer vessel for the oxygen or mixture of ozone and oxygen and optionally added high-purity water, exits from the buffer vessel to a consumer.

2. Device according to claim 1, wherein the anode chamber of the electrochemical cell is connected through said feed line for the high-purity water and through said drain line from the anode chamber for the oxygen or mixture of ozone and oxygen with the buffer vessel, forming a circuit for the high-purity water.

3. Device according to claim 2, wherein the feed line for the high purity water has a bypass between the buffer vessel and the anode chamber of the electrochemical cell in which bypass, a filter device is located, said filter device preventing the accumulation of trace materials or ions in the water.

4. Device according to claim 3, wherein the filter device consists of a cartridge with a solid bed containing a catalyst for breaking down the ozone dissolved in the water and an ion exchanger mixed bed downstream for removing ionogenic materials.

5. Device according to claim 3, wherein in order to adjust the portion of the high-purity water which is conducted through said bypass, the dimension of said feed line for the high purity water is adjustable, and a device for detecting a pressure drop across said filter device is provided.

6. Device according to claim 1, wherein a regulating valve is incorporated in a water line that supplies the high-purity water to the buffer vessel in order to maintain a preset degree of fullness of the buffer vessel or to supply a slightly larger quantity of water than corresponds to the required degree of fullness, and a branch line is provided with a shutoff valve from the feed line for the high-purity water into the anode chamber, through which surplus high-purity water can be removed from the buffer vessel so that no ions can accumulate in the buffer vessel.

7. Device according to claim 1, wherein a filter is incorporated in the feed line out of the buffer vessel, said filter passing only vapors and gases in order to obtain a mixture of ozone and oxygen in gaseous form and free of water to be conducted to the consumer.

8. Device according to claim 1, wherein a cell with an active part is provided as the electrochemical cell for generating a mixture of ozone and oxygen, said cell comprising a perfluorinated ion exchange membrane as a solid electrolyte, a porous anode with ruthenium dioxide, platinum, platinum metals, platinum oxides, or iridium dioxide as the anode material having a catalyst coating of β-lead dioxide; a porous cathode made of graphite and having a catalyst containing platinum, platinum metals, sintered bronze, or sintered copper; with hydrogen generated at the cathode as a byproduct being carried away through a drain line from the cathode chamber along with permeating water.

9. Device according to claim 1, wherein a cell with an active part is provided as the electrochemical cell to generate a mixture of ozone and oxygen, said active part comprising a perfluorinated ion exchange membrane as a solid electrolyte, a porous anode having ruthenium dioxide, platinum, platinum metals, platinum oxides, or iridium dioxide as anode material having a catalyst coating made of P-lead dioxide; and a porous cathode as a gas diffusion electrode, with an air supply channel being provided in the cathode chamber of the electrochemical cell in order to blow air over the cathode, with the air-oxygen generated electrochemically at the cathode being reduced to water with the resultant hydrogen and water and the remaining quantity of air being removed from the cathode chamber through a drain line from the cathode chamber.

10. Device according to claim 1, wherein a cell for generating oxygen is provided as the electrochemical cell, said cell having an active part comprising a perfluorinated ion exchange membrane as a solid electrolyte, a porous anode containing platinum or platinum metals as the anode material, and a porous cathode made of graphite with a catalyst containing platinum, platinum metals, sintered bronze or sintered copper; and hydrogen generated at the cathode as a byproduct is carried away through a drain line from cathode chamber together with the permeating water.

11. Device according to claim 1, wherein a cell with an active part comprising a perfluorinated ion exchange membrane as the solid electrolyte, a porous anode containing platinum or platinum metals as the anode material, and a porous cathode as a gas diffusion electrode, are provided as the electrochemical cell; wherein an air supply channel being provided in the cathode chamber of electrochemical cell in order to blow air over the cathode, so that air-oxygen generated electrochemically at the cathode is reduced to water together with resultant hydrogen, water and a remaining quantity of air are removed from cathode chamber through a drain line from the cathode chamber.

12. Device according to claim 11, wherein the electrochemical cell has a cathode side with air flowing through, and on the cathode side are provided two drain lines for media to leave the cathode chamber, wherein one drain line is provided for air flowing through and a second drain line is said drain line from the cathode chamber.

13. Device according to claim 1, wherein a first electrochemical cell generating oxygen from high-purity water is connected in series with a second electrochemical cell generating a mixture of ozone and oxygen, and a buffer vessel, wherein both first and second electrochemical cells are supplied with high-purity water from the buffer vessel, and both the oxygen generated and the mixture of ozone and oxygen generated are guided out of the first and second electrochemical cells into the buffer vessel along with the high-purity water, with high-purity water placed in circulation.

14. Device according to claim 13, further comprising means for adjusting the quantity of oxygen that can be generated in the electrochemical cell, whereby the ozone concentration in the mixture of ozone and oxygen produced in the electrochemical cell carried away from the buffer vessel through feed line out of the buffer vessel and in the electrochemical cell generating the ozone-oxygen mixture is adjustable.

15. Device according to claim 1, further comprising a supporting plate with cooling ribs molded on one side of supporting plate as a cooling body, and on a side of the supporting plate facing away from the cooling ribs at least the housing including the electrochemical cell is mounted, and wherein a power supply device with power electronics and a transformer for the electrochemical cell is provided, with at least the power electronics being mounted on the supporting plate of the cooling body.

16. Device according to claim 15, wherein the buffer vessel for the high purity water is mounted on the supporting plate of the cooling body.

17. Device according to claim 15, wherein the supporting plate of cooling body is in a vertical position, and the electrochemical cell is located in the lower part of the supporting plate and extends horizontally therefrom, the buffer vessel is located above electrochemical cell, and the power electronics and optionally transformer for the power supply are located between the electrochemical cell and the buffer vessel.

18. Device according to claim 15, wherein cooling panels located on the electrochemical cell or the buffer vessel.

19. Device according to claim 15, wherein the electrochemical cell is equipped with a cathode cooling body integrated into the cooling body.

20. Device according to claim 15, wherein the cooling body is an extrusion-molded section from metal.

21. Device according to claim 1, wherein the buffer vessel is connected on a side of the buffer vessel facing away from the supporting plate with cooling ribs.

22. Device according to claim 1, wherein the buffer vessel is equipped with a level control for controlling height of the water level, comprising a solenoid valve and a pump in a feed line for the high-purity water and an LC control device.

23. Device according to claim 1, further comprising a recycling system for tap water or permeating water from the cathode for high purity water for the high-purity water circuit of the electrochemical cell.

24. Device according to claim 1, wherein a preparation container is provided, said container being connected to a tap water line and to the cathode chamber of the electrochemical cell to receive permeating water, the preparation container being connected to an ion exchanger and said ion exchanger being connected to buffer vessel for purifying the water from preparation vessel being supplied to buffer vessel.

* * * * *